United States Patent
Anno et al.

(10) Patent No.: US 6,340,963 B1
(45) Date of Patent: Jan. 22, 2002

(54) LIQUID CRYSTAL DISPLAY DEVICE

(75) Inventors: Kouichi Anno; Masaaki Matsuda; Tetsuya Kawamura; Hiroshi Okawara, all of Mobara; Takeshi Tanaka, Chiba, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/448,514

(22) Filed: Nov. 24, 1999

(30) Foreign Application Priority Data

Nov. 26, 1998 (JP) .............................. 10-335846

(51) Int. Cl.[7] ................................ G09G 3/36

(52) U.S. Cl. .......................... 345/92; 345/206; 349/54

(58) Field of Search ............................... 345/50, 51, 87, 345/88, 90, 92, 95, 204, 205, 206, 211, 214, 100; 257/59, 72; 349/42, 43–54, 79, 106

(56) References Cited

U.S. PATENT DOCUMENTS 5,923,963 A * 7/1999 Yamanaka .................. 438/157
6,057,814 A * 5/2000 Kalt .............................. 345/58

* cited by examiner

*Primary Examiner*—Bipin Shalwala
*Assistant Examiner*—Mansour M. Said
(74) *Attorney, Agent, or Firm*—Antonelli, Terry, Stout & Kraus, LLP

(57) ABSTRACT

A is employed for eliminating variations of thin-film transistor threshold values to obtain enhanced on-screen displayability of high-quality images while simultaneously increasing the manufacturing yield and reliability. In a liquid crystal display device including: an active-matrix substrate having a plurality of scan electrode leads, a plurality of image signal electrode leads crossing over the plurality of scan electrode leads, scan electrode lead terminals which extend from the scan electrode leads in an effective display area thereof to one of the sides thereof, and image signal electrode terminals which extend from the image signal electrode leads in the effective display area to the other of the sides thereof neighboring upon the one side, being formed on an upper surface thereof respectively; a color filter substrate having a common electrode formed thereon; a layer of liquid crystals being sealed between the active-matrix substrate and the color filter substrate; common electrode lead terminals for connection to the common electrode; and driver circuitry including a scan electrode driver circuit and image signal electrode driver circuit for supplying the scan electrode lead terminals and image signal electrode lead terminals with more than one signal voltage for on-screen image visualization. The device further has a first electrostatic protective element for connecting a respective odd-numbered one of the image signal electrode terminals and a second electrostatic protective element for connecting a respective even-numbered one of the image signal electrode terminals. The first and second electrostatic protective leads are electrically divided into one another on the matrix substrate and electrically connected to one another by the common electrode lead terminals.

6 Claims, 9 Drawing Sheets

LIQUID CRYSTAL DISPLAY DEVICE

BACKGROUND OF THE INVENTION

The present invention relates generally to liquid crystal display devices of the active matrix type; and, more particularly, the invention relates to a liquid crystal display device having switching elements formed of semiconductor devices, such as thin-film transistors, having an improved on-screen display image quality which is obtained by correcting such characteristic dispersions as deviations of threshold voltage values of the switching elements and/or fluctuations of the threshold value of the thin-film transistors.

In recent years, active-matrix liquid crystal display devices which use thin-film transistors as its switching elements have been widely employed for use as monitor units in various types in image visualization equipment and/or information processing apparatus.

A typical liquid crystal display device of this type is arranged to include an active matrix substrate with a plurality of (multiple) switching elements (thin-film transistors) for pixel selection formed on an electrically insulating or dielectric substrate and a color filter substrate having thereon a common electrode and a color filter, which substrates are bonded together to define therebetween a thin gap or space in which a layer of liquid crystals is sealed, to thereby provide a liquid crystal panel with requisite driver circuitry assembled together.

In recent years, as visual display monitors have been increasing in screen size and precision, it is becoming more and more difficult to make uniform the characteristics of those thin-film transistors formed on an active-matrix substrate. Another serious problem associated with currently available liquid crystal display architectures is the presence of risks of destruction and characteristic degradation of thin-film transistors due to the effects of static electricity during the manufacture of the liquid crystal display devices.

One typical prior known approach to making the thin-film transistor threshold value even is to apply thermal processing to finally manufactured thin-film transistors. In addition, one prior art electrostatic remedy is to provide one or more "special" leads for electrostatic protection at selected portions of a substrate to be cut away when the intended liquid crystal panel is completed, the electrostatic protective leads being connected to associative leads of thin-film transistors.

SUMMARY OF THE INVENTION

Unfortunately, the conventional approaches suffer from limitations for making the thin-film transistor threshold value even during thermal processing in the manufacture of active-matrix substrates, which can result in the presence of a non-uniformity or unevenness in the characteristics of respective active-matrix substrates. Such a transistor characteristic deviation leads to the occurrence of undesired brightness irregularities due to variations in voltage potentials being applied to a layer of the liquid crystals.

It is therefore a primary object of the present invention to provide a new and improved liquid crystal display device which is capable of avoiding the problems now faced in the prior art and which is also capable of increasing the manufacturing yield and reliability thereof.

To attain the foregoing object, the present invention provides a liquid crystal display device which is specifically arranged so that a plurality of parallel elongate pixel signal electrode leads formed on an active-matrix substrate are subdivided into two groups of odd-numbered and even-numbered leads in the order of the layout sequence as counted from one side edge of such a substrate, a first common wiring line (electrostatic protective common lead) is provided for protection of the group of odd-numbered pixel signal electrode leads against externally attendant static electricity, a second common wiring line (electrostatic protective common lead) is provided for protection of the remaining group of even-numbered pixel signal electrode leads against static electricity, and the first electrostatic protective common lead and the odd-numbered pixel signal electrode lead group, on one hand, and the second electrostatic protective common lead and the even-numbered pixel signal electrode lead group, on the other hand, are connected together via two electrostatic protective elements (mutually inversely coupled nonlinear elements or alternatively a resistive element), respectively.

The first and second electrostatic protective common leads are provided such that they are electrically independent of each other on the active enable successful defect inspection and threshold value adjustment of respective thin-film transistors of pixel signal electrode leads connected to these electrostatic protective common leads, while, in the state wherein a color filter substrate has been bonded, causing them be electrically connected together via a conductive member (conductive paste or the like) for use in electrically connecting the active-matrix substrate and a common electrode of the color filter substrate.

In addition, a third electrostatic protective common lead is provided at a location outside of the first and second electrostatic protective common leads in such a manner that the first and second plus third electrostatic protective common leads are, electrically independent of one another on the active-matrix substrate while, in the state that the color filter substrate has been bonded, letting these leads be electrically connected together via a conductive member for electrical connection between the active-matrix substrate and the common electrode of the color filter substrate.

Some typical arrangements unique to the instant invention are as follows.

(1) A liquid crystal display device comprises:

a color filter substrate having a common electrode formed on a dielectric substrate and color filters of multiple colors;

an active-matrix substrate disposed as to oppose the color filter substrate with a specified gap or space defined therebetween in which a layer of liquid crystals is sealed, thereby constituting a liquid crystal panel, the active-matrix substrate including a plurality of scan electrode leads formed on a dielectric substrate, a plurality of image signal electrode leads formed to cross over or "intersect" the scan electrode leads, a plurality of thin-film transistors which are two-dimensionally laid out to form an effective display area by connection to the scan electrode leads and image signal electrode leads, pixel electrodes connected to respective ones of the pixel electrodes, an additive capacitive element connected to each of the pixel electrodes, a common electrode lead terminal for connection to the common electrode formed on the color filter substrate, scan electrode lead terminals which extend from the scan electrode leads and image signal electrode leads up to one side outside of the effective display area, along with image signal electrode lead terminals which extend to the other side neighboring upon this one side, and a dielectric protective film coated so as to cover at least the thin-film transistors;

driver circuitry, including a scan electrode driver circuit and image signal electrode drive circuit, for supplying the scan electrode lead terminals and image signal electrode lead terminals with more than one signal voltage for on-screen image display;

first and second electrostatic protective leads extending along (in parallel to) one side with the pixel signal electrode lead terminals formed thereat and being electrically connected to respective ones of the first and second electrically divided common electrode lead terminals as formed along one opposite side, with the effective display area lying therebetween; and first and second electrostatic protective elements for respectively connecting between the first and second electrostatic protective leads on one hand and the oddnumbered and even-numbered ones of the image signal electrode leads on the other hand, wherein the first and second common electrode lead terminals are electrically connected together via a conductive member for electrical connection relative to the common electrode formed on the color filter substrate in the state that the color filter substrate has been bonded.

(2) A liquid crystal display device comprises:

a color filter substrate having a common electrode formed in a dielectric substrate and color filters of multiple colors;

an active-matrix substrate disposed so as to oppose the color filter substrate with a specified gap or space defined therebetween in which a layer of liquid crystals is sealed, thereby constituting a liquid crystal panel, the active-matrix substrate including a plurality of scan electrode leads formed on a dielectric substrate, a plurality of image signal electrode leads formed to cross over or "intersect" the scan electrode leads, a plurality of thin-film transistors two-dimensionally laid out to form an effective display area by connection to the scan electrode leads and image signal electrode leads, pixel electrodes connected to respective ones of the pixel electrodes, an additive capacitive element connected to each of the pixel electrodes, a common electrode lead terminal for connection to the common electrode formed on the color filter substrate, scan electrode lead terminals extended from the scan electrode leads and image signal electrode leads up to one side outside of the effective display area along with image signal electrode lead terminals extended to the other side neighboring upon this one side, and a dielectric protective film coated so as to cover at least the thin-film transistors;

driver circuitry including a scan electrode driver circuit and image signal electrode driver circuit for supplying the scan electrode lead terminals and image signal electrode lead terminals with more than one signal voltage for on-screen image display;

first, second, and third electrostatic protective lead terminals electrically divided and extending in parallel to the one side in which the pixel signal electrode lead terminals are formed and being formed along the opposite side with the effective display area lying therebetween;

first and second electrostatic protective leads for electrical connection to respective ones of the first and second plus third common electrode lead terminals along with a third electrostatic protective lead placed at a location opposite to the effective display area with respect to the first and second electrostatic protective leads; and first and second electrostatic protective elements for connection between the first and second electrostatic protective leads on one hand and the odd-numbered and even-numbered ones of the image signal electrode leads on the other hand, wherein the first and second plus third common electrode lead terminals are electrically connected together via more than one conductive member for use in electrically connecting between it and the common electrode formed on the color filter substrate in the state that the color filter substrate has been bonded.

(3) Two nonlinear elements that are inverse-directionally connected to each other are used as said electrostatic protective elements for connection between the electrostatic protective leads and the image signal electrode leads in the above paragraph (1) or (2).

(4) A resistive element is used as said electrostatic protective element for connection between the electrostatic protective leads and the image signal electrode leads in (1) or (2).

With such an arrangement, according to this invention, it is possible to achieve the intended remedy for elimination of any possible destruction of the thin-film transistors otherwise occurring due to static electricity by the presence of the electrostatic protective leads, while at the same time enabling correction or rectification of possible variations of the threshold values of respective thin-film transistors constituting the pixels through application of an appropriate voltage thereto and also making it possible to attain successful execution of the required test procedure for inspection of unwanted electrical short-circuiting between the image signal electrode leads and the scan electrode leads along with other lead inspection procedures. This in turn makes it possible to increase the manufacturing yield of a liquid crystal display device, thus enabling provision of a high-quality liquid crystal display device.

It is noted that the present invention should not be limited only to the above-noted arrangements and those embodiments as will be described later in the description, but may be modifiable and alterable into a wide variety of forms without departing from the true spirit and scope of the invention.

These and other objects, features and advantages of the present invention will become more apparent from the following description when taken in conjunction with the accompanying drawings.

DETAILED DESCRIPTION

One preferred embodiment of the present invention will be described in detail below. Note here that although this embodiment is illustratively presented as a liquid crystal display device of what is called the "chip-on-glass (COG)" type, which has at a terminal section on an active-matrix substrate those semiconductor elements or components making up a part of the driver circuitry thereof, the instant invention may also be similarly applicable, when the need arises, to those liquid crystal display devices of the TAB (Tape Automated Bonding) type, in which all of the driver circuits are mounted on an outer-side substrate of the liquid crystal panel.

Figure 1:
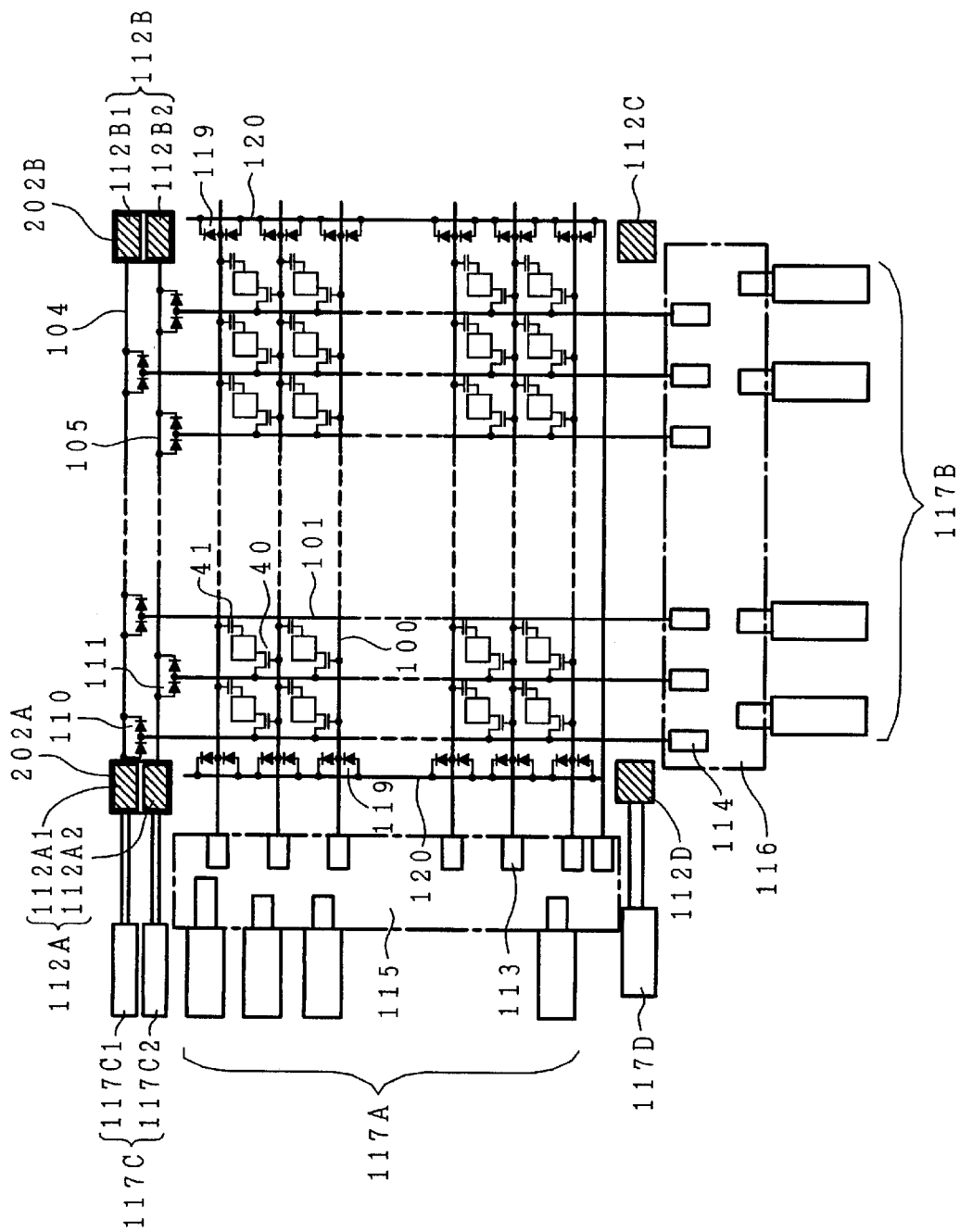
FIG. 1 is an electrical equivalent circuit diagram of an active-matrix substrate representing a first embodiment of the liquid crystal display device in accordance with the present invention.

FIG. 1 is an electrical equivalent circuit diagram of an active-matrix substrate for use in describing a first embodiment of the liquid crystal display device in accordance with the present invention. The same drawing shows circuitry mounted on a final product substrate that has been cut out of an original substrate (mother plate), but is in a state prior to bonding the active-matrix substrate to a color filter substrate (dielectric substrate, not shown).

In the embodiment shown herein, a plurality of parallel elongate scan electrode leads 100 are provided on the substrate (dielectric substrate, here, glass substrate; the same goes with the following embodiments set forth below) while a plurality of parallel image signal electrode leads 101 intersect or cross over these scan electrode leads 100, with thin-film transistors 40 connected to corresponding picture elements or "pixels" at intersections therebetween. The plurality of pixels with the thin-film transistors disposed thereat are two-dimensionally laid out on the substrate to form a 2D pixel matrix, thereby to constitute an effective display area.

A respective one of the thin-film transistors 40 is associated with a pixel electrode 103 connected thereto, to which pixel electrode an additive capacitive element 41 is connected. Common electrode lead terminals 112A, 112B, 112C, 112D are used for connection to a common electrode which is formed on a color filter substrate (not shown). Each of the common electrode lead terminals 112A and 112B is subdivided into two separate portions causing first and second electrostatic protective leads 104 and 105 to be connected to the divided terminals 112A1–112B1 and 112A2–112B2, respectively.

Scan electrode lead terminals 113 and image signal electrode lead terminals 114 extend from the image signal electrode leads 101 and scan electrode leads 100 up to one outer side of the effective display area, which terminals are associated with respective outputs of a scan electrode driver circuit 115 and an image signal electrode driver circuit 116 connected thereto.

The scan electrode driver circuit 115 and image signal electrode driver circuit 116 have input terminals to which external connection terminals 117A and 117B are connected.

Reference numerals 117C designates an external connection terminal which is connected to the common electrode lead terminal 112A, whereas reference numerals 117D denotes an external connection terminal which is connected to the common electrode lead terminal 112D. As the external connection terminals 117C and 117D are power supply terminals for use in supplying power to the common electrode of the color filter substrate, such terminals may basically be formed of a single pad, although the external connection terminal 117C may be divided into two portions. By connecting the two-divided external connection terminal 117C1 and 117C2 to the divided common electrode lead terminals 112A1 and 112A2, respectively, it is possible to readily carry out the required test/inspection procedure by use of these paired external connection terminals. Additionally, the common electrode lead terminals 112C and 112D are not always necessary.

Electrostatic protective diode common lines 120 on the side of the scan electrode leads are provided on the side of the scan electrode lead terminals 113 and its opposite side, respectively, which are connected to the scan electrode leads 100 through a pair of scan electrode lead side electrostatic protective diodes 119 that are inverse-directionally connected to each other.

First electrostatic protective lead 104 and second electrostatic protective lead 105 are formed on a selected side that is in parallel to one side along which the image signal electrode lead terminals 114 are formed and opposes the side with the effective display area laid therebetween, for electrical connection to respective terminals 112A1, 112A2 of the common electrode lead terminal 112A and respective terminals 112B1, of the common electrode lead terminal 112B plus respective terminals of the common electrode lead terminals 112A, 112B. The first electrostatic, protective lead 104 and each of the odd-numbered (as counted from the left side) image signal electrode leads 101, along with the second electrostatic protective lead 105 and each of the even-numbered image signal electrode leads 101, are connected together by a pair of nonlinear elements (referred to as "electrostatic protective diodes" hereinafter) 110, 111 that are connected to each other in the inverse direction.

With such an arrangement, the above-noted odd-numbered image signal electrode leads 101 are electrically connected via the electrostatic protective diode 110 to both of the common electrode lead terminals 112A1, 112B1 that are in turn connected to the opposite or "counter" electrode, whereas the even-numbered image signal electrode leads 101 are electrically connected via the electrostatic protective diode 111 to both of the common electrode lead terminals 112A2, 112B2 which are connected to the counter electrode.

When bonding a color filter substrate to the active-matrix substrate, respective terminals 112A1, 112A2 of the common electrode lead terminal 112A and respective terminals 112B1, 112B2 of the common electrode lead terminal 112B are electrically connected by conductive paste materials (conductive members) 202A, 202B containing conductive beads therein, which are made of ball-like resin spacers or beads with metal-plated surfaces.

As the first electrostatic protective lead 104 and second electrostatic protective lead 105 are separated from each other in the state prior to bonding the active-matrix substrate and color filter substrate together, it becomes possible to perform the intended electrical shorting inspection between the odd-numbered and even-numbered image signal electrode leads 101 either between the pair of common electrode lead terminals 112A1, 112A2 or between the other pair of common electrode lead terminals 112B1, 112B2.

In addition, since the electrostatic protective diodes 110 and 111 are provided on the opposite side of the image signal electrode lead terminals 114, which are exposed to the outside and thus suffer from the risk of easy "invasion" of static electricity, these electrostatic protective diodes 110, 111 will hardly be subjected to any bad influence of such static electricity and, for this reason, will no longer be destroyed, even when these electrostatic protective diodes are low in dielectric withstanding/breakdown voltage level.

After having bonded the active-matrix substrate and the color filter substrate together and having electrically connected the common electrode lead terminals 112A–112D to the common electrode of the color filter substrate by use of the conductive paste materials 202A, 202B, the common electrode of the color filter substrate and the image signal electrode leads 101 of the active-matrix substrate are connected together via the electrostatic protective diodes 110 and 111.

In this structure, a negative voltage of several tens of volts relative to said common electrode is applied to the electrostatic protective diode common lines 120 of the scan electrode leads 100, while maintaining the common electrode at a constant voltage potential (in other words, retaining the image signal electrode leads 101 at a fixed potential). This application voltage will be different depending upon several conditions or criteria, including the requisite pixel number and/or lead capacitance values of a liquid crystal panel.

One example is that, upon applying a voltage of about –50V for ten seconds, it is possible to reduce the threshold value of a thin-transistor 40 whose threshold value has been shifted or offset to a higher level. Due to this, it is possible to obtain a sufficient turn-on current of the thin-film transistor 40, which in turn makes it possible to sufficiently apply the required voltage to the liquid crystals during a selection time period, thereby eliminating or at least greatly suppressing on-screen display irregularities which would otherwise occur due to variation or deviation of the voltage being applied to the liquid crystals.

Additionally, one problem experienced with prior art liquid crystal panels is that, in cases where the color filter substrate is charged due to electrification during manufacture, a potential difference can take place between an active-matrix substrate and a color filter substrate causing a voltage potential on the color filter substrate to act on a thin-film transistor(s) via a liquid crystal layer resulting in unwanted offset of the threshold value thereof However, with this embodiment, such an unwanted thin-film transistor threshold voltage offset will no longer occur because of the fact that in such a case the image signal electrode leads 101 are at the same voltage potential as that of the common electrode of the color filter substrate via the electrostatic protective diodes 110, 111.

In the way discussed above, according to the illustrative embodiment, it is possible to make uniform the threshold voltage values which have been shifted due to production variations and/or static electricity occurring during manufacturing processes, thereby enabling reduction of on-screen display irregularities, while at the same time enabling prevention of electrostatic damage to constituent circuits of thin-film transistors and the like.

Figure 2:
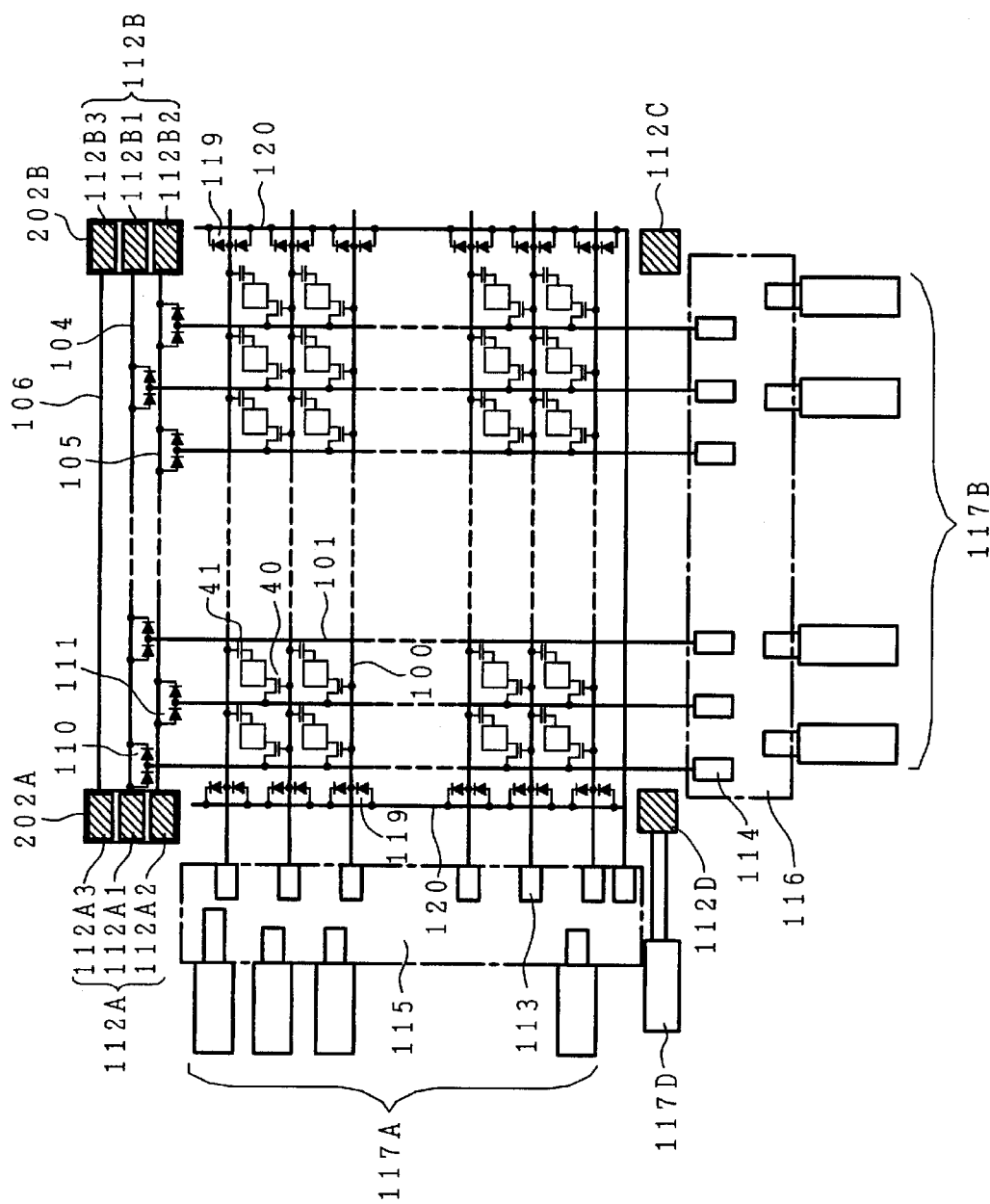
FIG. 2 is an electrical equivalent circuit diagram of an active-matrix substrate representing a second embodiment of the liquid crystal display device in accordance with the present invention.

Referring next to FIG. 2, there is depicted an equivalent circuit diagram of an active-matrix substrate for use in describing a second embodiment of the liquid crystal display device in accordance with the instant invention. This embodiment is different from the first embodiment in some points which follow.

More specifically, the individual ones of the common electrode lead terminals 112A and 112B are divided into three separate portions which are used as first, second and third terminals 112A1, 112A2 and 112A3 or 112B1, 112B2 and 112B3. In addition, the first and second first electrostatic protective leads 104 and 105 are connected to the first and second terminals 112A1–112A2 and 112B1–112B2, respectively.

The first and second first electrostatic protective leads 104 and 105 are respectively associated with the odd- and even-numbered ones of the image signal electrode leads 101 via the electrostatic protective diodes 110, 111 that are comprised of a pair of two diodes that are inverse-directionally coupled together.

And, the third electrostatic protective common lead 106 are connected to the third terminals 112A3 and 112B3.

When bonding the color filter substrate to the active-matrix substrate, respective terminals 112A1, 112A2, 112A3 of the common electrode lead terminal 112A and respective terminals 112B1, 112B2, 112B3 of the common electrode lead terminal 112B are electrically connected by conductive paste materials (conductive members) 202A, 202B, which are the same as those used in the first embodiment.

With such an arrangement in this embodiment, as static electricity enters the third electrostatic protective common lead 106 in the state wherein a liquid crystal panel is in its final product form, such static electricity will no longer directly affect the first electrostatic protective lead 104 and second electrostatic protective lead 105.

According to the present invention, it is possible to further reduce possible electrostatic influence or interference acting on the first and second electrostatic protective diodes 110, 111, which are connected to the image signal electrode leads 101, when compared to the first embodiment.

Figure 3:
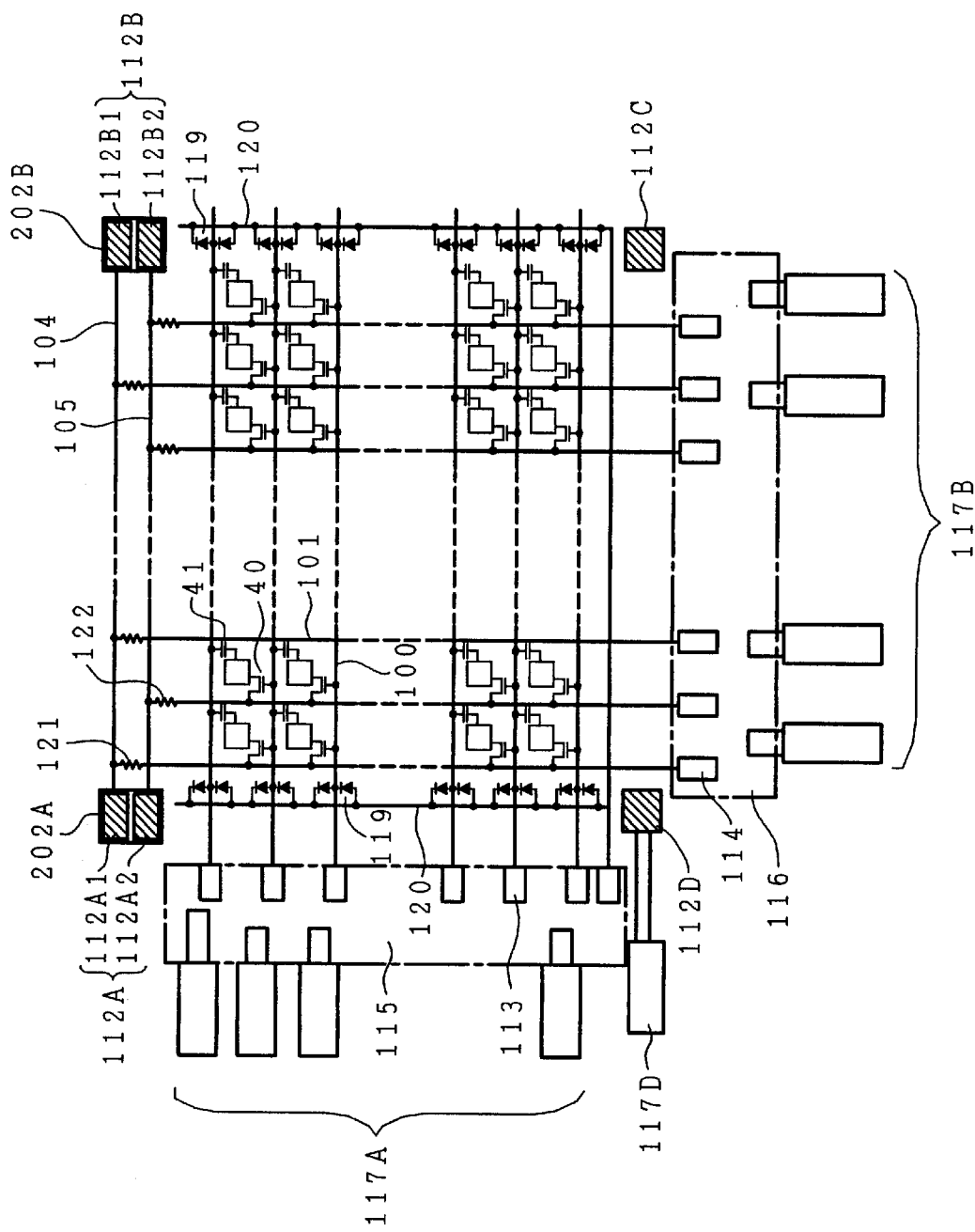
FIG. 3 is an electrical equivalent circuit diagram of an active-matrix substrate representing a third embodiment of the liquid crystal display device in accordance with the present invention.

FIG. 3 is an equivalent circuit diagram of an active-matrix substrate for explanation of a third embodiment of the liquid crystal display device in accordance with the invention. This embodiment is a modification of the first embodiment and differs from the first embodiment in that resistive elements 121, 122 are connected between the first and second electrostatic protective leads 104,1105 and the odd- and even-numbered image signal electrode leads 101, respectively.

This illustrative embodiment is arranged so that the electrostatic protective diodes 110, 111 as used in the first embodiment are replaced with the resistors 121, 122, which in turn makes it possible to obtain similar effects and advantages to those of the first embodiment while simplifying the circuit configuration.

Figure 4:
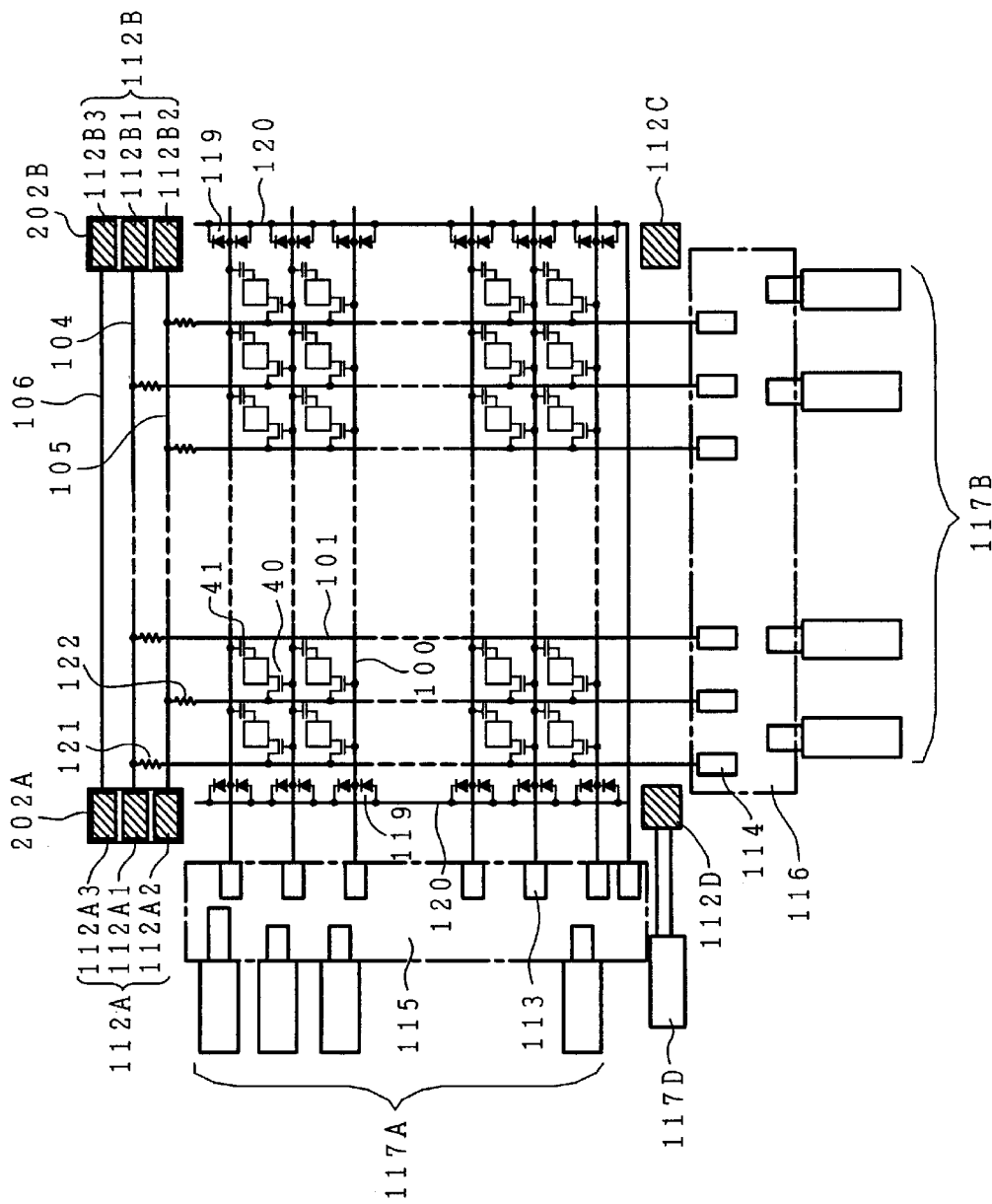
FIG. 4 is an electrical equivalent circuit diagram of an active-matrix substrate representing a fourth embodiment of the liquid crystal display device in accordance with the present invention.

FIG. 4 is an equivalent circuit diagram of an active-matrix substrate for use in describing a fourth embodiment of the liquid crystal display device of the invention. This embodiment is a modification of the second embodiment and is different therefrom in that resistors 121, 122 are connected between the first and second electrostatic protective leads 104, 105 and the odd- and even-numbered ones of the image signal electrode leads 101, respectively. Additionally, the third electrostatic protective common lead 106 is the same as that provided in the second embodiment.

This embodiment is arranged so that the electrostatic protective diodes 110, 111 used in the first embodiment are replaced with the resistors 121, 122, which in turn makes it possible to obtain similar effects and advantages to those of the second embodiment while simplifying the circuit configuration.

With the above-noted second to fourth embodiments also, either the terminals 112A1, 112A2 or the terminals 112A1, 112A2, 112A3 of the common electrode lead terminal 112A may be provided with the divided external connection terminals 117C1, 117C2 or 117C3 that are similar to those provided in the first embodiment shown in FIG. 1.

As stated above, according to the respective embodiments,. it is possible to make those threshold voltage values even that have been shifted due to manufacturing process variations and/or static electricity occurring during production processes, thereby enabling achievement of successful inspection for determination of whether electrical shorting is present or absent between neighboring image signal electrode leads. This in turn makes it possible to reduce any possible on-screen display irregularities, while simultaneously enabling prevention of electrostatic damage of constituent circuits of the thin-film transistors or other elements.

Note here that although in each of the above embodiments conductive beads are employed as the, conductive paste materials for use in electrically connecting the common electrode lead terminals of the active-matrix substrate to the common electrode of the color filter substrate, such materials may be replaced where necessary with other paste materials containing therein metallic power of good conductivity, including gold or silver or other similar suitable materials.

Figure 5A:
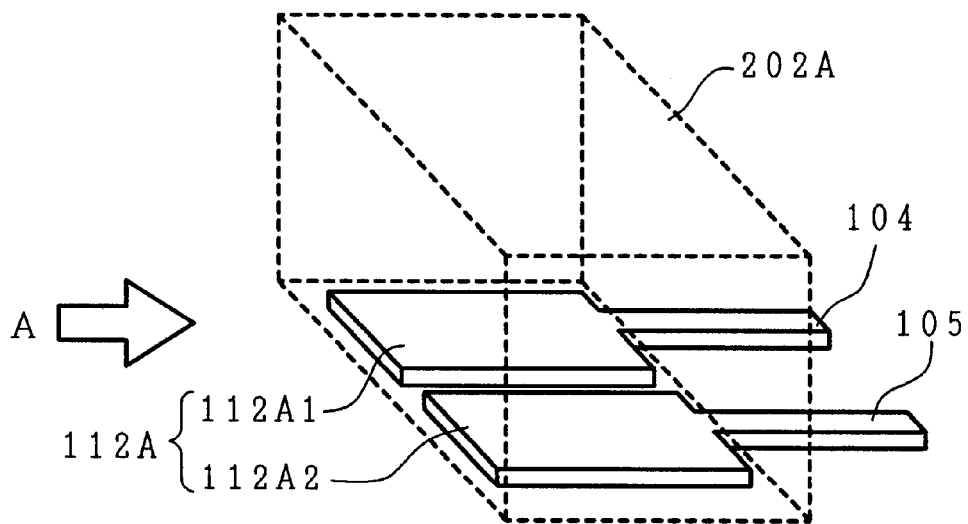
FIG. 5A is a perspective view of a model of an electrical connection section between subdivided common electrode lead terminals of an active-matrix substrate.
Figure 5B:
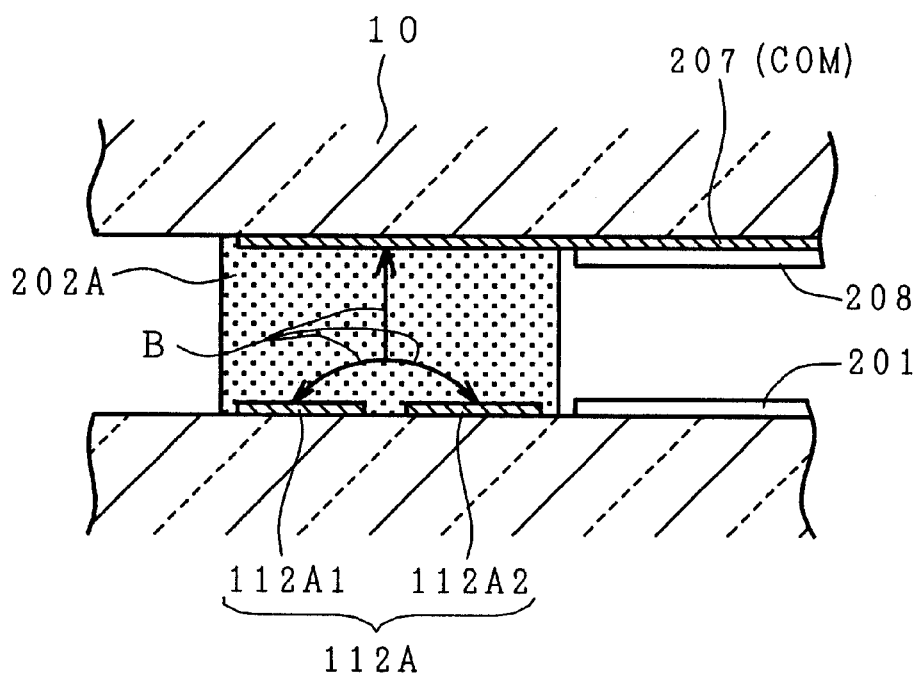
FIG. 5B is a sectional view of the electrical connection section as seen from the direction of arrow "A" in FIG. 5A.

FIGS. 5A and 5B are diagrams showing an electrical connection section between divided common electrode leads on an active-matrix substrate. While these drawings indicate a specific electrical connection section between two-divided common electrode lead terminals of the first embodiment, the same features may be employed with the remaining embodiments as disclosed herein.

FIG. 5A illustrates one state in which the two-divided common electrode lead terminals are coated with a conductive paste material, whereas FIG. 5B shows an electrical connection section as seen from a selected direction along arrow "A" of FIG. 5A. Note that in FIG. 5A the active-matrix substrate and color filter substrate are eliminated for purposes of convenience of illustration only.

As better shown in FIG. 5A, the common electrode lead terminal 112A that was formed on the active-matrix substrate is divided into two separate portions that are used as respective terminals 112A1 and 112A2, to which the first and second electrostatic protective leads 104, 105 are connected, respectively.

When a color filter substrate is bonded to this active-matrix substrate, a conductive paste 220A is interposed therebetween. The conductive paste 220A is coated over the divided terminals 112A1 and 112A2.

Accordingly, as shown in FIG. 5B, the pair of divided terminals 112A1, 112A2 of the common electrode lead terminal 112A as formed on the active-matrix substrate 1 are electrically connected to a common electrode 207 of the color filter substrate 10 in, a way as indicated by arrow "B" and are also electrically connected together. Note that reference numerals 201 and 208 are used to the designate optical orientation or "alignment" films that are formed on the respective substrates.

Figure 6:
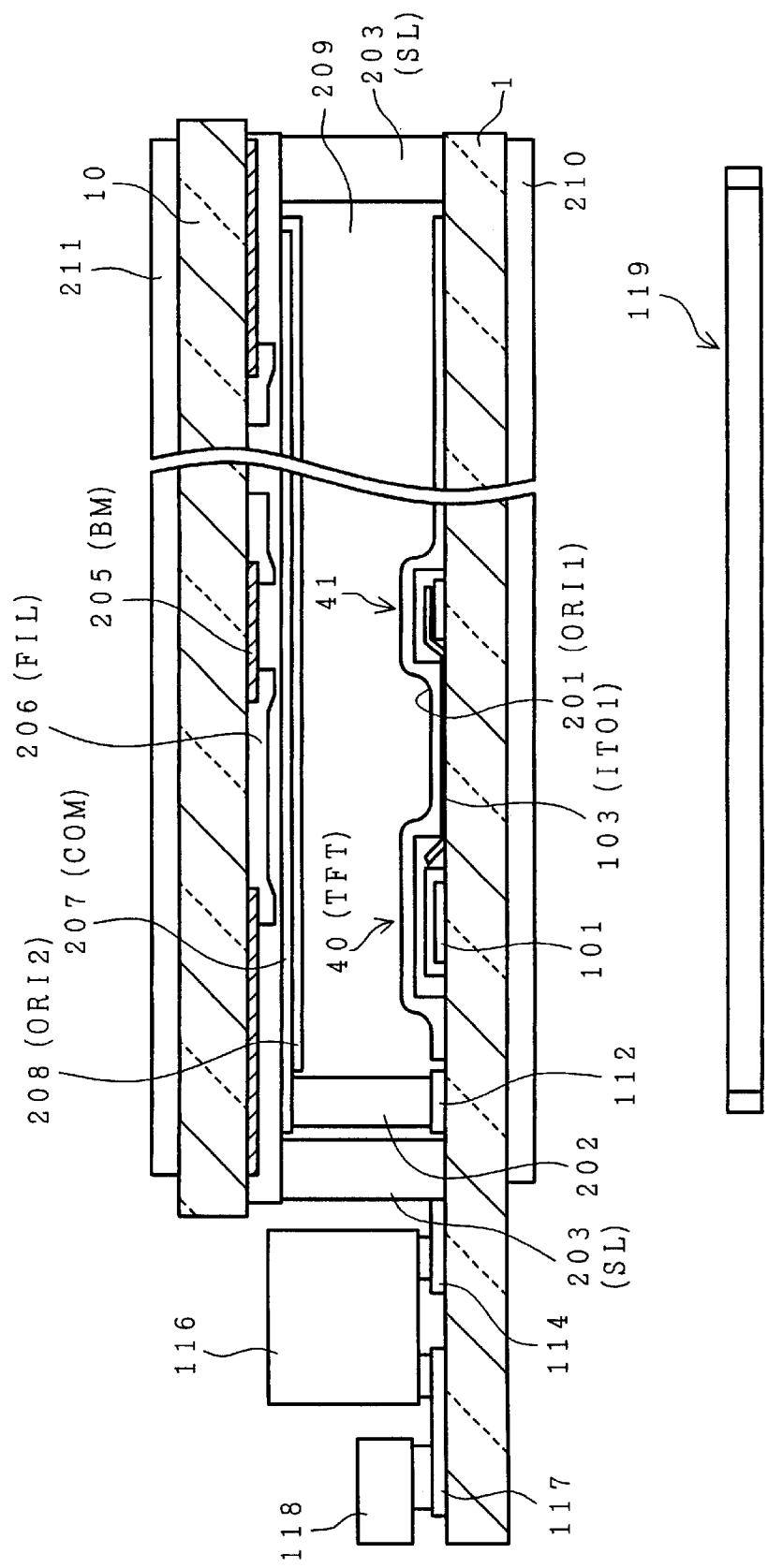
FIG. 6 is a schematic cross-sectional diagram of an example of a liquid crystal panel in accordance with the present invention.

FIG. 6 shows a schematic cross-sectional view of one exemplary liquid crystal panel embodying the present invention. The liquid crystal panel shown herein is arranged to include an active-matrix substrate 1 having thereon more than one thin-film transistor (TFT) 40 formed in its effective display area, as well as a load capacitive element (Cadd) 41, a pixel electrode (ITO1) 103 and an alignment film (ORI1) 201. The liquid crystal panel also includes a color filter substrate 10 with a black matrix (BM) 205, a color filter (FIL) 206, a common electrode (COM) 207 and an alignment film (OR12) 208 formed thereon. The active-matrix substrate 1 and color filter substrate 10 are spatially laminated over each other and bonded together with a thin gap or space defined therebetween, in which a layer of liquid crystals (LC) 209 is sealed by sealing the periphery by means of a seal material (SL) 203.

A common electrode lead terminal 112 of the active-matrix substrate 1 and the common electrode (COM) 207 of the color filter substrate 10 are electrically connected together by a conductive paste material 202.

The image signal electrode lead terminal 114, which extends from the common electrode lead terminal 112, is positioned outside of the seal material (SL) 203, with an image signal electrode driver circuit (IC chip) 116 mounted so as to be coupled between it and external connection terminal 117.

The image signal electrode driver circuit 116 (IC chip) 116 is mounted by chip-on-glass (COG) techniques at the periphery of the active-matrix substrate 1. The thin-film transistor 40 is designed to have an inverted staggered structure and is indicated herein as a transistor that has a specific pattern, wherein an alumina film and a gate insulating are laminated on a gate electrode 101 made of aluminum and wherein a semiconductor layer is similar in pattern to the gate insulating film; however, similar results are obtainable even when the transistor is replaced with any other transistors having different structures.

Additionally, the external connection terminal 117 is connected to its associative terminal of an external driver circuit lead (printed circuit board or else) 118.

The liquid crystals (LC) 209 have been initially aligned at the interfaces between two alignment films 201 (OR11) and 208 (OR12) in accordance with the alignment controllability which is given to respective alignment films.

Note that, although FIG. 6 shows the cross-section on the side of extended part of the image signal electrode lead terminal 114, the same structure is also applicable to an extension side of the scan electrode lead terminal 113.

A back-light (BL) unit 119 including a light guide plate and one or more linear lamps is disposed on the back surface of this liquid crystal panel for on-screen visualization of an image formed in the effective display area of the liquid crystal panel with its back face illuminated.

Figure 7:
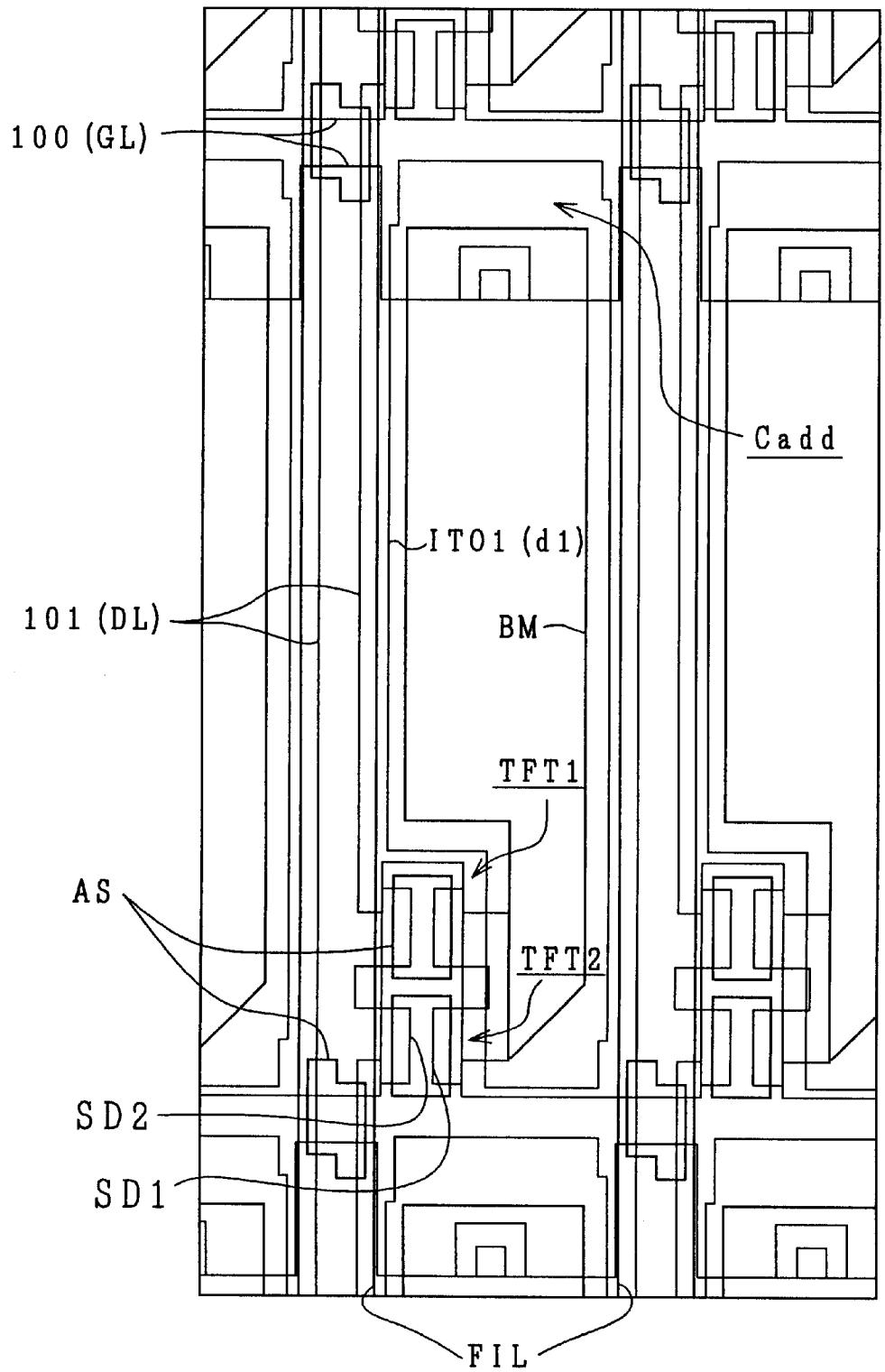
FIG. 7 is a plan view of one pixel of an active-matrix liquid crystal display device incorporating the principles of the present invention along with peripheral circuitry operatively associated therewith.

FIG. 7 is a plan view of a selected part of an active-matrix liquid crystal display device also embodying the invention, including one of the pixels and its peripheral components operatively associated therewith. Each pixel is laid out within a specified surface area surrounded by two neighboring scan electrode leads 100 (GL) and two neighboring image signal electrode leads 101 (DL) which intersect therewith (i.e. in a region surrounded by four leads).

Each pixel includes a thin-film transistor TFT (here, the thin-film transistor consists of a pair of transistors TFT1 and TFT2) and pixel electrode 103 (ITO1), plus capacitive element 41 (Cadd). The scan electrode leads 100 extend in a column direction, and a plurality of leads are provided in a row direction. The image signal electrode leads 101 (DL) extend in the row direction, and a plurality of leads are provided in the column direction. In FIG. 7, SD2 denotes a drain electrode.

On the side of the active-matrix substrate, with the liquid crystal (LC) 209 being used as a reference, thin-film transistors 40 (TFT) and transparent pixel electrodes 103 (ITO1) are formed; and, on the side of the color filter substrate, color filters FIL and optical shielding black matrix BM are formed. The two substrates are designed, for example, to have a thickness of 1.1 mm or 0.7 mm.

Figure 8:
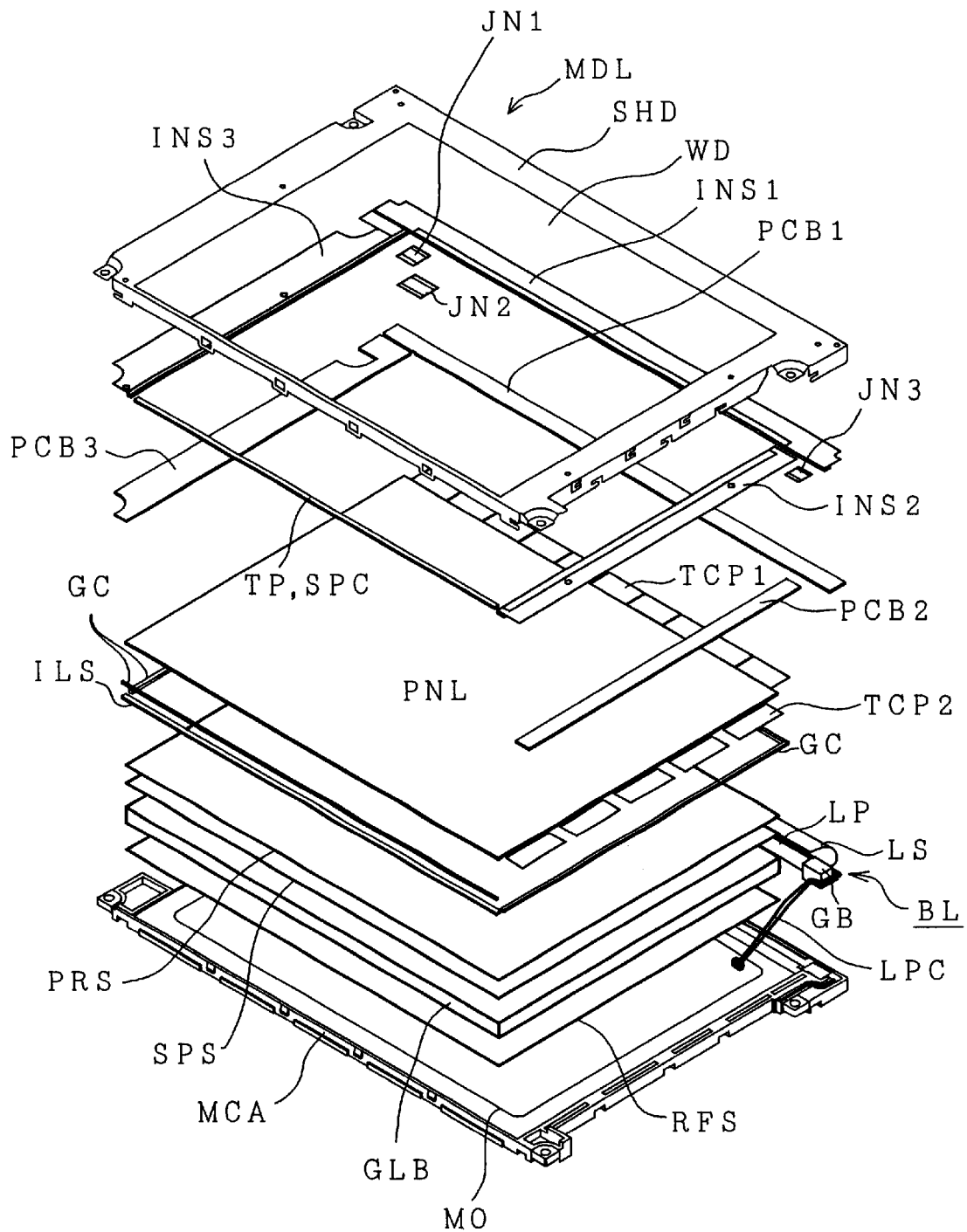
FIG. 8 is an exploded perspective view of an overall structure of an active-matrix liquid crystal display device embodying the invention.

FIG. 8 shows an exploded perspective view of an overall structure of an active matrix liquid crystal display device embodying the invention. This diagram shows one practical structure of the liquid crystal display device of the invention (referred to hereinafter as a module MDL with a liquid crystal panel, circuit boards, backlight and other components integrally assembled together).

"SHD" designates a shield casing (also known as a metal frame) made of a metal plate; WD denotes a display window; INS1-3 indicate dielectric sheets; PCB1-3 represent printed circuit boards (PCB1 is a drain-side circuit board for use as an image signal lead 101 drive circuit board, PCB2 is a gate-side circuit board for scan electrode lead 100 drive circuitry, and PCB3 is an interface circuit board); JN1-3 denote joiners for electrical connection among the circuit boards PCB1-3; CH11 denotes image signal electrode driver circuitry 6 directly mounted on the active matrix substrate; CH12 denotes scan electrode driver circuitry directly mounted similarly; PNL denotes a liquid crystal display panel (also called a liquid crystal panel, simply); GC denotes a rubber cushion; ILS denotes an optical shielding spacer; PRS denotes a prism sheet; SPS denotes an optical diffuser sheet; GLB denotes a light guide plate; RFS denotes a reflection sheet; MCA denotes a lower-side casing (mold frame) formed by all-at-a-time machining; MO denotes an opening in the MCA; LP denotes fluorescent tube; LPC denote a lamp cable; GB denotes a rubber bush for support of the fluorescent tube LP; BAT denotes two-sided adhesive tape; and BL denotes a backlight unit consisting essentially of more than one fluorescent tube and light guide plate and other elements, wherein diffuser plate members are stacked or laminated over one another to assemble the liquid crystal display module MDL.

The liquid crystal display module MDL is designed to have two different types of enclosure/retaining members, such as the lower-side casing MCA and shield case SHD, and is structured from an integral assembly of the shield case SHD made of a chosen metal with the dielectric sheets INS1-3 and circuit boards PCB1-3, plus the liquid crystal panel PNL received and rigidly secured therein, and the lower-side case MCA accommodating therein the backlight BL, consisting essentially of the linear lamp LP and light, guide plate GLB plus prism sheet PRS and other elements.

The interface circuit board PCB3 has circuit components mounted thereon, including more than one integrated circuit (IC) chip for receiving an image signal(s) incoming from an external host and also a control signal or signals, such as a timing signal or the like, along with a timing converter TCON for processing the timing to generate a required clock signal.

Although in FIG. 8 the liquid crystal panel has been described in a way which indicates that it employs the so-called COG scheme, with its image signal driver circuitry and scan electrode driver circuitry (ICs CH1, CH2) being directly mounted on the active-matrix substrate, the present invention should not be limited only to the liquid crystal panel of the type which uses such a mounting technique, but may also be applied to traditional mounting schemes using tape carrier package (TCP) structures.

Figure 9:
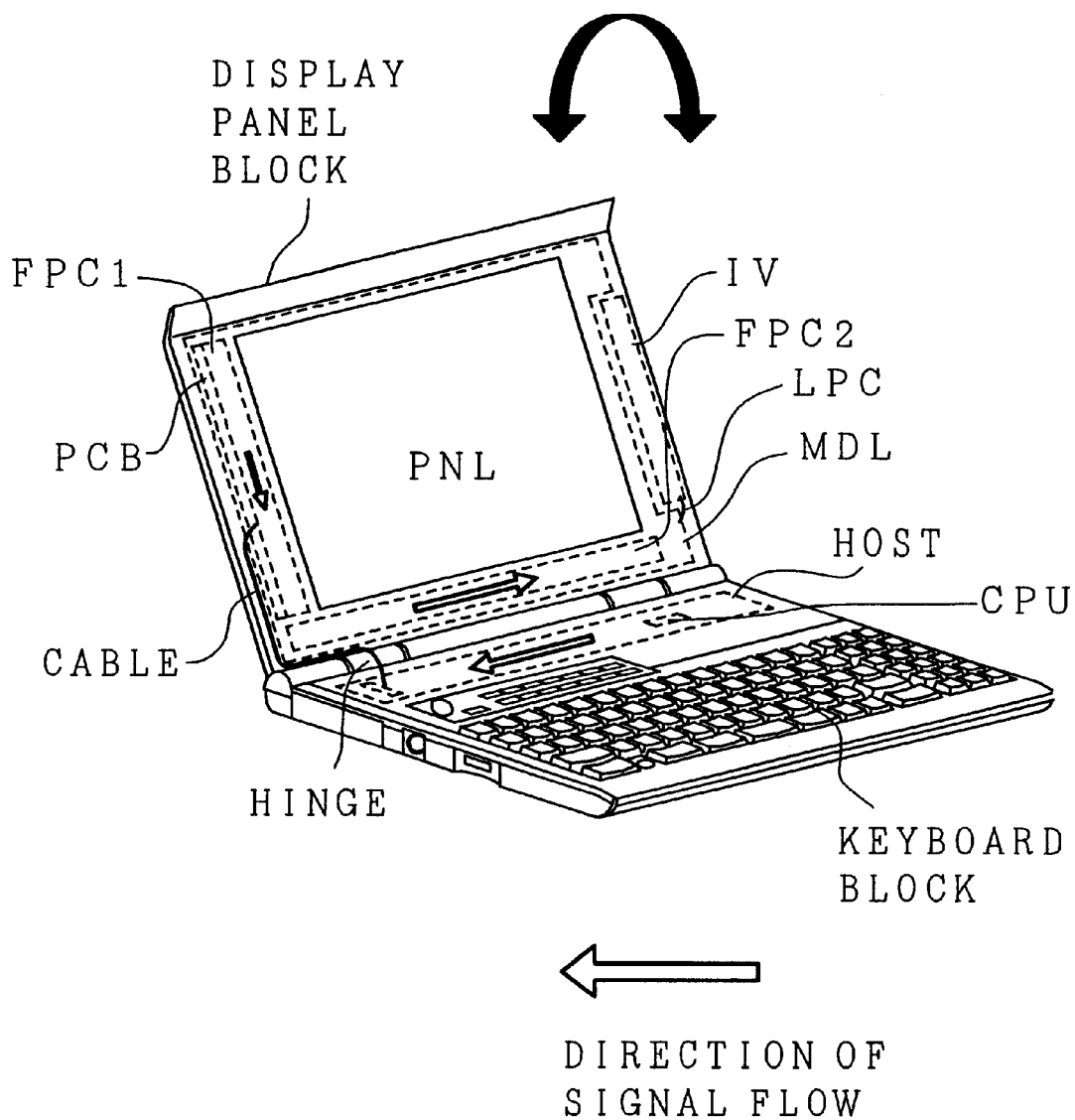
FIG. 9 is a perspective view of a notebook personal computer in accordance with the invention.

FIG. 9 depicts a perspective view of a notebook type personal computer (PC) employing the liquid crystal display device in accordance with the invention. This notebook PC (portable or handheld PC) is generally constituted from a keyboard unit (main body unit) and a display unit which is tiltably coupled by hinges to the keyboard unit. The keyboard unit is designed to accommodate a keyboard, a host (host computer) for signal generation functions, such as a CPU, while the display unit has the liquid crystal panel PNL at the periphery of which a PCB having driver circuit boards FPC1, FPC2 and control chip CON mounted thereon is assembled along with its associated components, including but not limited to an inverter power supply board IV for use as the backlight power supply.

This portable PC comes with a liquid crystal panel of the, type which is structured in the way stated supra in relation to the various embodiments and is thus capable of obtaining high-quality image displayability without suffering from any display irregularities.

As has been explained above, according to the present invention, it is possible to provide an improved liquid crystal display device which is capable of making uniform any possible variations of threshold values of thin-film transistors due to static electricity occurring at process steps after manufacture of a liquid crystal panel, while at the same time enabling on-screen visualization of high-quality images that are free from display irregularities, with manufacturing yield and reliability enhanced.

While we have shown and described several embodiments in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

What is claimed is:

1. A liquid crystal display device comprising:
   a color filter substrate including an insulating substrate having thereon a common electrode and color filters of multiple colors;
   an active-matrix substrate including an insulating substrate opposing said color filter substrate with a specified gap defined therebetween for sealing therein a layer of liquid crystals to thereby constitute a liquid crystal panel, said active-matrix substrate having on its surface a plurality of scan electrode leads, a plurality of image signal electrode leads intersecting said scan electrode leads, an array of thin-film transistors organized into a two dimensional matrix to thereby form an effective display area by connection with the scan electrode leads and image signal electrode leads, pixel electrodes connected to respective ones of the thin-film transistors, more than one additive capacitive element connected to the pixel electrodes, a common electrode lead terminal for connection to said common electrode formed on the color filter substrate, scan electrode lead terminals which extend from said scan electrode leads within the effective display area up to a first side lying outside of this effective display area, image signal electrode lead terminals elongated from said image signal electrode leads in said effective display area up to a second side lying outside of the effective display area and neighboring upon said first side, and a dielectric protective film overlying at least said thin-film transistors;

a scan electrode driver circuit for supplying said scan electrode lead terminals with a signal voltage for display;

an image signal electrode driver circuit for supplying said image signal electrode lead terminals with a signal voltage for display;

first and second pairs of common electrode lead terminals formed at both said first sides facing each other with said effective display area lying therebetween, each of said first and second pairs being formed by electrical subdivision;

first and second electrostatic protective leads extending along the second side with said pixel signal electrode lead terminals formed thereat and being electrically connected to said first and second pairs of common electrode lead terminals, respectively;

a first electrostatic protective element for connection to the first electrostatic protective lead and one of a group of odd-numbered ones and a group of even-numbered ones of said image signal electrode leads; and a second electrostatic protective element for connection to the second electrostatic protective lead and a remaining of the group of odd-numbered one and the group of even-numbered image signal electrode leads, wherein said first and second pairs of common electrode lead terminals are electrically connected to each other via a conductive member for use in electrically connecting between said first and second pairs of common electrode lead terminals and the common electrode formed on said color filter substrate as bonded together with said active-matrix substrate.

2. A liquid crystal display device according to claim 1, wherein said electrostatic protective elements include a pair of nonlinear devices inverse-directionally connected to each other between said electrostatic protective leads and said image signal electrode leads.

3. A liquid crystal display device according to claim 1, wherein said electrostatic protective elements include a resistive element connected between said electrostatic protective leads and said image signal electrode leads.

4. A liquid crystal display device comprising:

a color filter substrate including an insulating substrate having thereon a common electrode and color filters of multiple colors;

an active-matrix substrate including an insulating substrate opposing said color filter substrate with a specified gap defined therebetween for sealing therein a layer of liquid crystals to thereby constitute a liquid crystal panel, said active-matrix substrate having on its surface a plurality of scan electrode leads, a plurality of image signal electrode leads intersecting said scan electrode leads, an array of thin-film transistors organized into a two dimensional matrix to thereby form an effective display area by connection with the scan electrode leads and image signal electrode leads, pixel electrodes connected to respective ones of the thin-film transistors, more than one additive capacitive element connected to the pixel electrodes, a common electrode lead terminal for connection to said common electrode formed on the color filter substrate, scan electrode lead terminals which extend from said scan electrode leads within the effective display area up to a first side lying outside of this effective display area, image signal electrode lead terminals elongated from said image signal electrode leads in said effective display area up to a second side lying outside of the effective display area and neighboring upon said first side, and a dielectric protective film overlying at least said thin-film transistors;

a scan electrode driver circuit for supplying said scan electrode lead terminals with a signal voltage for display;

an image signal electrode driver circuit for supplying said image signal electrode lead terminals with a signal voltage for display;

first and second plus third pairs of common electrode lead terminals formed at both said first sides opposing each other with said effective display area lying therebetween, each of the first to third pairs being formed through electrical trichotomous subdivision;

first and second electrostatic protective leads extending along the second side with said pixel signal electrode lead terminals formed thereat and being electrically connected to said first and second pairs of common electrode lead terminals, respectively;

a third electrostatic protective lead extending along the second side with said pixel signal electrode lead terminals formed thereat, being electrically connected to the third pairs of common electrode lead terminals, and being disposed at an opposite side of the first and second electrostatic protective leads to said effective display area;

a first electrostatic protective element for connecting together the first electrostatic protective lead and one of a group of odd-numbered ones and a group of even-numbered ones of said image signal electrode leads; and a second electrostatic protective element for connecting together the second electrostatic protective lead and a remaining one of the group of odd-numbered and the group of even-numbered image signal electrode leads, wherein said first to third pairs of common electrode lead terminals are electrically connected to one another via a conductive member for use in electrically connecting between said first to third pairs of common electrode lead terminals and the common electrode formed on said color filter substrate bonded together with said active-matrix substrate.

5. A liquid crystal display device according to claim 4, wherein electrostatic protective elements include a pair of nonlinear devices inverse-directionally connected to each other between said electrostatic protective leads and said image signal electrode leads.

6. A liquid crystal display device according to claim 4, wherein said electrostatic protective elements include a resistive element connected between said electrostatic protective leads and said image signal electrode leads.

* * * * *